Figure 1:
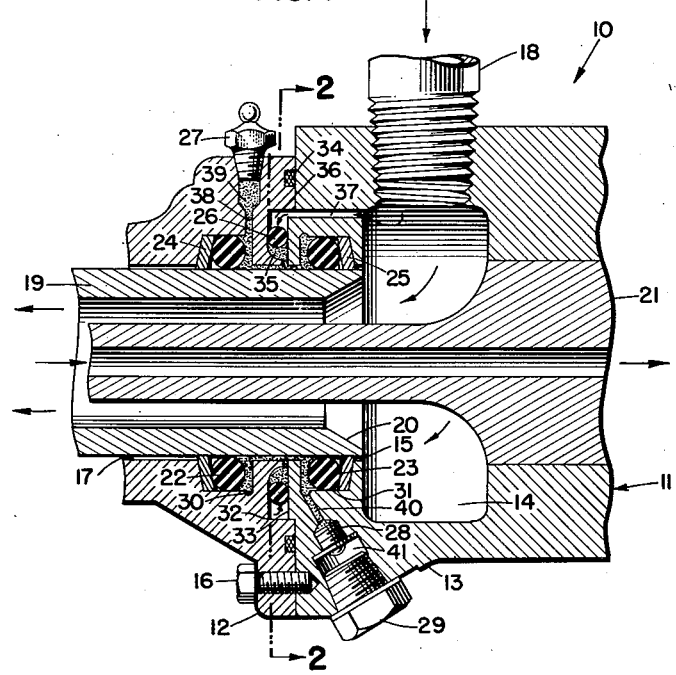

Oct. 22, 1957  W. W. WILLIAMS  2,810,592
FLUID-ACTUATED PACKING ARRANGEMENT FOR JOINT
Filed Aug. 4, 1953

INVENTOR
WOODROW W. WILLIAMS

BY
*J. O'Brien*
*G. Baxter Warner*
ATTORNEYS

United States Patent Office 2,810,592
Patented Oct. 22, 1957

2,810,592
FLUID-ACTUATED PACKING ARRANGEMENT FOR JOINT

Woodrow Wayne Williams, Sunnyvale, Calif., assignor, by mesne assignments, to the United States of America as represented by the Secretary of the Navy Application August 4, 1953, Serial No. 374,164

2 Claims. (Cl. 285—96)

The present invention relates to a packing arrangement and more particularly to a fluid-tight seal for use in those devices wherein fluid under pressure is to be transferred from a stationary member to a movable member or vice versa.

Heretofore, it has been the practice, in those arrangements wherein it was necessary to provide a fluid-tight seal between two relatively movable members, as for example, where it is desired to convey pressure fluid from a stationary member to a rotary member, to utilize either simple seals or multiple packings between the members. The use of simple seals has proved to be impractical owing to the fact that it is difficult, if not impossible, to properly lubricate such seals, and the lack of such proper lubrication results in the destruction of the seal after only a short period of use. While multiple packings may be adequately lubricated so as to extend the life thereof, the use of such packings results in a complicated construction which is difficult and relatively expensive to manufacture.

Applicant has overcome the disadvantages associated with the prior art packing arrangements by providing a fluid-tight sealing device which is simple in construction and which, because of the inclusion of a novel lubricating and pressure balancing arrangement, may be used for extended periods of time without the deterioration or destruction of the parts thereof.

Accordingly it is an object of this invention to provide a fluid-tight seal.

Another object of this invention is to provide a fluid-tight seal between two relatively movable members.

Still another object is to provide a fluid-tight seal for use in those devices wherein fluid under pressure is to be conveyed from a stationary member to a rotary member or vice versa.

Still a further object is to provide a fluid-tight seal wherein the pressure differential across the seal are substantially balanced.

Another object of this invention is to provide a packing arrangement which is simple in construction and which incorporates means for assuring the proper lubrication of the parts.

Yet another object is to provide a novel lubricating arrangement for a rotary seal.

And another object is to provide a novel rotary seal lubricating arrangement for supplying lubricant under pressure to the parts of and substantially balancing the pressure differential across the seal.

Figure 2:
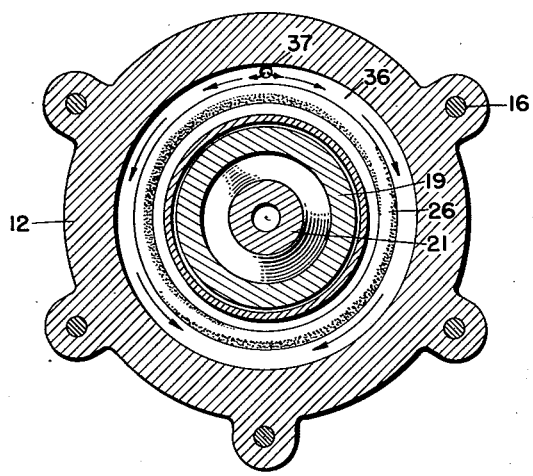

Other objects and many of the attendant advantages of this invention will be readily appreciated as the same becomes better understood by reference to the following detailed description when considered in connection with the accompanying drawings wherein:

Fig. 1 is a longitudinal section through the apparatus incorporating the present invention; and Fig. 2 is a section taken substantially along the line 2—2 of Fig. 1.

Referring now to the drawings wherein there is illustrated one preferred embodiment of the present invention, 10 designates broadly an arrangement incorporating applicant's novel seal, which arrangement comprises a stationary part generally indicated as 11 including separately formed flanged sections 12 and 13, the former being tubular in form and the latter being provided with a chamber 14 having a reduced circular opening 15 extending through its flanged portion and of the same diameter as the inside diameter of section 12. Sections 12 and 13 are suitably secured together, as by bolts 16 interconnecting the flanges thereof, with said reduced opening and tubular section 12 axially aligned to form a circular bore 17 for receiving a rotary part 19 having a diameter slightly less than the diameter of said bore. Rotary part 19 is tubular in form and has its hollow interior communicating with chamber 14 in stationary section 13 whereby fluid under pressure may be conveyed from conduit 18, secured to stationary section 13, through chamber 14 and thence through said rotary member to some desired portion of the rotary structure (not shown). The open end of rotary member 19 is beveled as at 20 so as to facilitate the flow of pressure thereinto. A stationary tubular member 21 is rigidly secured to stationary section 13 and extends through the rotary member 19, along the axis thereof, for providing a return path for the pressure fluid.

The sealing arrangement of the present invention includes generally rubber O-rings 22 and 23, annular leather rings 24 and 25, a circular elastic lubricant pressure O-ring 26, a lubricant pressure fitting 27, a relief valve 28, and a closure plug 29. Referring now more specifically to the sealing arrangement, stationary sections 12 and 13 are provided with annular grooves 30 and 31 respectively, formed in the wall of bore 17 and having a depth slightly less than the cross-sectional diameter of O-rings 22 and 23, said rings having an inside diameter slightly less than the outside diameter of rotary member 19, whereby when said rings are assembled on said rotary member and the former are positioned in said annular grooves, the rubber, or other elastic material constituting the rings, is somewhat compressed thus providing an adequate seal for preventing the leakage of pressure fluid from chamber 14 to the space between the wall of bore 17 and the outer surface of rotary member 19 and thence through the joint between stationary sections 12 and 13 or along stationary section 12. Annular leather rings 24 and 25 are positioned in grooves 30 and 31 on opposite sides of seal rings 22 and 23, as shown, to further improve the seal.

Because of the compression of seal rings 22 and 23, whereby to provide an effective fluid-tight seal, it is necessary to provide means for supplying lubricant to said rings whereby to reduce the coefficient of friction between said rings and the other parts of the device and prevent the deterioration thereof. Applicant has provided a novel means for assuring such proper lubrication of the rings, which means includes an annular seat 32 formed in the flanged end of stationary section 12. Stationary section 13 is provided with an annular projection 33 which in the assembled position of sections 12 and 13 projects slightly into said seat, whereby to maintain said sections in alignment and provide a substantially fluid tight joint provided with packing as at 34. The bottom of seat 32 is formed with a rounded shoulder 35, the end of which is spaced somewhat, in the assembled position of stationary sections 12 and 13, from the end surface of annular projection 33 whereby to form an annular passage between chamber 36, formed by seat 32, and bore 17. Positioned in chamber 36 is an elastic rubber O-ring 26 having, in its unstretched condition, an inside diameter substantially equal to the outside diameter of the rotary member and having a cross-sectional diameter substantially equal to or slightly greater than the spacing between the bottom of seat 32 and the end face of annular projection 33, fluid thereby being prevented from flowing between the walls of chamber 36 and the surface of said ring. A passage 37 in stationary section 13 provides communication between chamber 14 in section 13 and the chamber 36 formed by seat 32 whereby the pressure on the fluid in chamber 14, or, in other words, line pressure, is caused to act on the outer surface of elastic ring 26.

A lubricant receiving passage 38 is provided in stationary section 12 connecting annular groove 30 and recess 39, in which is secured a pressure lubricant fitting 27. It will be seen that communication is had between passage 38, annular grooves 30 and 31, and chamber 36 by virtue of the annular space between the wall of bore 17 and the outer surface of rotary member 19, whereby when lubricant under pressure is supplied to fitting 27, it will flow into annular grooves 30 and 31 and chamber 36. The pressure of the lubricant will act on the inner surface portion of elastic ring 26 to cause the latter to be expanded radially outward. A passage 40 connects annular groove 31 and recess 41, wherein there is secured the relief valve 28 and closure plug 29.

The manner of operation of the above-described lubricating system is as follows: Closure plug 29 is removed and suitable lubricant under pressure is supplied to fitting 27, whereupon lubricant will flow, in the aforedescribed manner, into annular grooves 30 and 31 and chamber 36. Upon entering chamber 36, the lubricant will act upon elastic ring 26 to expand the same radially outward to the outer diameter of said chamber whereby when the lubricant receiving spaces are filled, the ring tension will provide an initial radial load against the lubricant. When the ring is expanded into contact with the outer diameter wall of chamber 36, the resulting pressure buildup will cause relief valve 28 to open, thus indicating that the lubrication chamber is full. Closure plug 29 is now replaced. At this point the pressure on the lubricant, which serves to lubricate rubber seal rings 22 and 23, has an initial value substantially determined by the elasticity of ring 26. When, during the operation of the device, pressure fluid is supplied to chamber 14 through inlet conduit 18, from a source not shown the pressure thereof will be exerted on the outer surface of elastic ring 26 through passage 37 whereby the lubricant will be subjected to the additional pressure of the fluid in chamber 14 or line pressure. The total lubricant pressure, resulting from the elastic load of ring 26 and line pressure, will be greater than line or chamber 14 pressure by an amount equal to the elastic load of ring 26 and will be adequate, regardless of line pressure, to assure proper lubrication of the seal rings 22 and 23 whereby to reduce the wear on and extend the life of said rings. It will thus be seen that the pressure differential across the seal ring is substantially balanced.

It will be apparent from the foregoing teachings that the present sealing arrangement may equally well be applied to arrangements wherein the relative movement between the parts is linear rather than rotary.

Applicant has thus provided a sealing device, for use where pressure fluid is to be conveyed from a stationary member to a movable member, which sealing device is fluid tight, relatively simple in construction, and which, because of the inclusion of a novel lubricating and pressure balancing system, may be operated for extended periods of time without deterioration of the parts thereof.

Obviously many modifications and variations of the present invention are possible in the light of the above teachings. It is therefore to be understood that within the scope of the appended claims the invention may be practiced otherwise than as specifically described.

What is claimed is:

1. In a device for conveying fluid under pressure from a stationary source of pressure fluid to a hollow movable member, an apertured stationary member having a chamber adapted to be connected to the source of pressure fluid and communicating with said aperture, said hollow movable member being mounted in, and having a cross section slightly less than the cross section of said aperture, the end of said hollow movable member being open and communicating with said chamber whereby pressure fluid may flow from said chamber in the stationary member into the opening in said hollow movable member, a fluid-tight seal including a pair of spaced resilient seal rings mounted in grooves in said stationary member and surrounding and resiliently engaging said hollow movable member within said aperture and resiliently engaging said stationary member to provide a fluid-tight seal therebetween, an annular recess formed in said stationary member and communicating with the enclosed space defined by said rings, the wall of said aperture, and the outer surface of said hollow movable member, said recess and enclosed space forming a sealing fluid reservoir, pressurized sealing fluid in said reservoir, an elastic ring within and having a cross-sectional diameter substantially equal to the width of said recess whereby said ring may act like a piston to apply an initial pressure to said sealing fluid in said reservoir, and a passage providing communication between the chamber in said stationary member and said recess at the outer diameter thereof whereby the pressure of the fluid in said chamber will act on said elastic ring to apply an additional pressure to said sealing fluid and the total sealing fluid pressure thereby being somewhat greater than the pressure of the fluid to be conveyed.

2. The arrangement according to claim 1 and a passage, having a pressure fitting therein, communicating with said enclosed space whereby said sealing fluid under pressure may be forced into said reservoir and thereby expanding said elastic ring radially outwardly in said recess whereby said initial sealing fluid pressure is created.

References Cited in the file of this patent

UNITED STATES PATENTS

| Number | Name | Date |
|---|---|---|
| 890,735 | Van Doren | June 16, 1908 |
| 1,835,877 | Joyce | Dec. 8, 1931 |
| 2,155,628 | Williams | Apr. 25, 1939 |
| 2,345,019 | Van Alstyne | Mar. 28, 1944 |
| 2,444,868 | Allen et al. | July 6, 1948 |
| 2,448,118 | Pellettere | Aug. 31, 1948 |
| 2,538,375 | Montgomery | Jan. 16, 1951 |